UNITED STATES PATENT OFFICE.

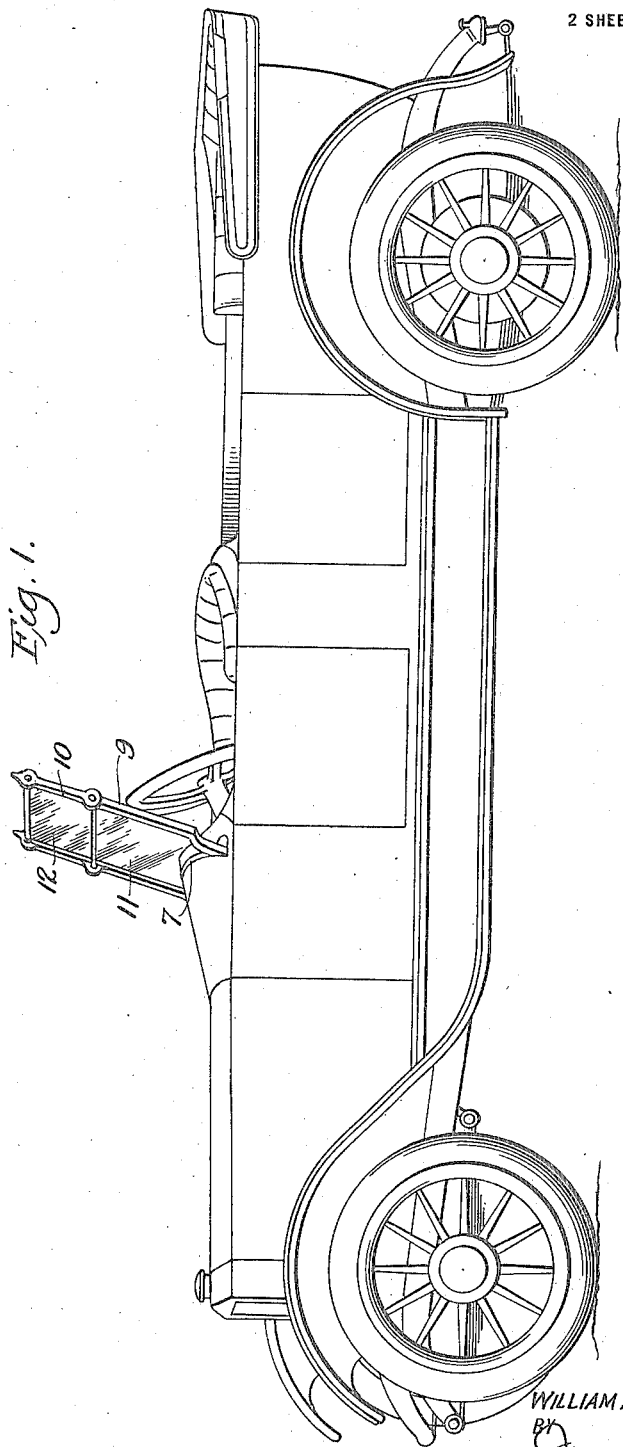

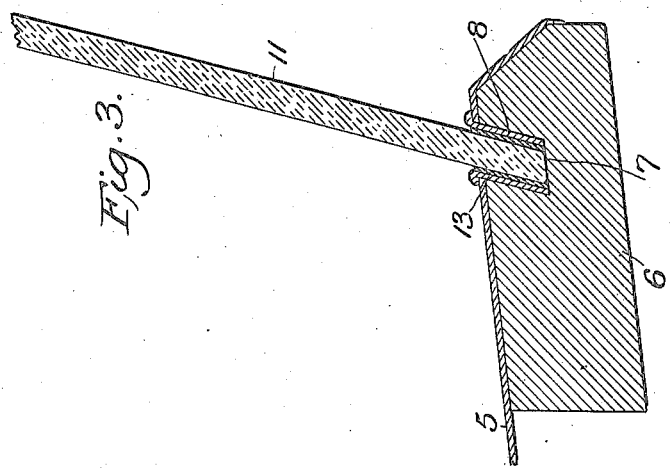
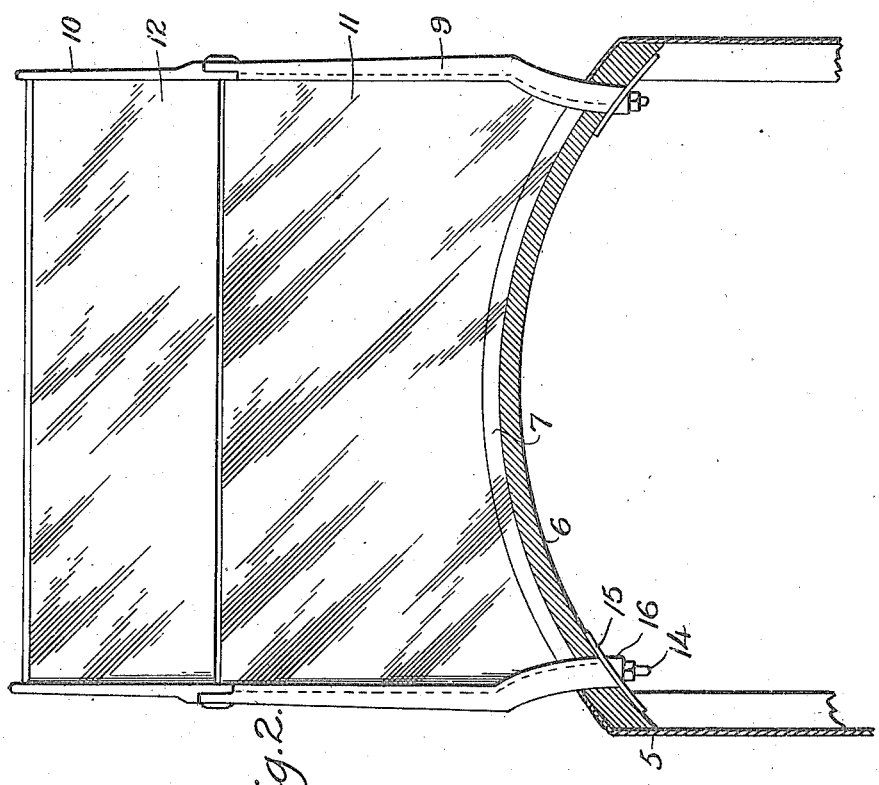

WILLIAM A. HENDERSON, OF LARCHMONT, NEW YORK, ASSIGNOR TO HOLBROOK COMPANY, OF NEW YORK, N. Y., A CORPORATION OF NEW YORK.

WIND-SHIELD FOR VEHICLES.

1,248,855.     Specification of Letters Patent.     Patented Dec. 4, 1917.

Application filed May 12, 1917. Serial No. 168,079.

*To all whom it may concern:*

Be it known that I, WILLIAM A. HENDERSON, a citizen of the United States, and resident of Larchmont, in the county of Westchester and State of New York, have invented certain new and useful Improvements in Wind-Shields for Vehicles, of which the following is a specification.

This invention relates to wind shields for vehicles and consists of the usual transparent plate of one or more sections supported by uprights from the cowl or cover of the engine and whose lower edge is carried in a slot in the upper side of the cover, the object of the invention being to dispense with framing for the lower edge and which is not only costly but adds weight to the vehicle.

These and other details and objects of the invention are more fully described in the following specification, set forth in the appended claims hereto, and illustrated in the accompanying drawings forming a part of this application and in which:

Figure 1 is a perspective view of an auto vehicle showing the improved wind shield in use.

Fig. 2 is a cross sectional view through the cowl of the vehicle.

Fig. 3 is a sectional detail view through the frame of the cowl.

In order to simplify the construction of a vehicle wind shield the heavy and cumbersome frame located on the body cowl 5 is dispensed with and in the arched frame work 6 a groove 7 is cut about half its depth and its sides are faced with sheet metal as at 8.

This groove 7 is near the rear end of the cowl and being about the width of the plate glass will not present an unsightly appearance nor weaken the frame of the cowl, although it extends almost the entire width thereof.

At each end of the groove 7 is a post 9, each post carrying a pivoted extension 10 and located in grooves on the inner sides of the posts are the transparent wind shields 11 and 12, preferably of glass plate, covering the entire space between the posts and extending into the groove 7 as shown in Fig. 3.

The lower shield 11 is inclined at an angle from the perpendicular while the upper shield 12 may be adjusted to any desired angle to deflect the air striking and traveling up the lower shield. The groove 7 is also cut on the same angle as the shield whose lower end it receives and carries, and a packing 13 of rubber or other flexible material is interposed between the shield and the metal walls 8 to hold the former firmly in its place and prevent rattling of the parts.

The lower end of each post 9 is provided with a threaded stem 14 which passes through a metal plate 15 secured to the frame work 6 and suitable washers 16 are interposed to maintain the posts in their upright positions.

This construction rigidly secures the posts to the cowl and affords sufficient strength to need no cross bar to connect them and the groove firmly holds the lower end of the shield 11, so that considerable weight and expense is saved.

It is obvious that the parts may be otherwise arranged or modified without departing from the essential features above described or from the scope of the appended claims.

What I claim as new is:

1. In a wind shield, the combination of a cowl of a vehicle body having a groove and a shield whose edge is carried in the groove and supported by the cowl.

2. In a wind shield, the combination of the cowl of a motor vehicle having a transverse groove and a transparent shield supported at its sides and having it lower edge inserted in the groove.

3. In a wind shield, the combination of the cowl of a motor vehicle having a transverse groove in its upper side, a transparent shield whose lower edge is adapted to lodge in the groove, and uprights at the side of the shield.

4. In a wind shield, the combination of the cowl of a motor vehicle having a transverse groove at the end of its upper side, an inclined transparent shield with its lower edge lodged in the groove, posts at the ends of the groove and the sides of the shield, and an adjustable shield at the upper ends of the posts.

5. In a wind shield, the combination of the cowl of a motor vehicle having a transverse groove, upright supports at the ends of the groove, threaded stems at the ends of the supports and passing through the cowl, nuts for the stems, a transparent shield carried by the supports and lodged in the groove of the cowl, packing in the groove and at the sides of the lower edge of the shield, and an adjustable shield above the first shield.

Signed at New York, in the county of New York, and State of New York, this 7th day of May, A. D. 1917.

WILLIAM A. HENDERSON.

Copies of this patent may be obtained for five cents each, by addressing the "Commissioner of Patents, Washington, D. C."